July 1, 1947. V. R. JOHNSON ET AL 2,423,324
WELDER HANDLE
Filed Dec. 2, 1944
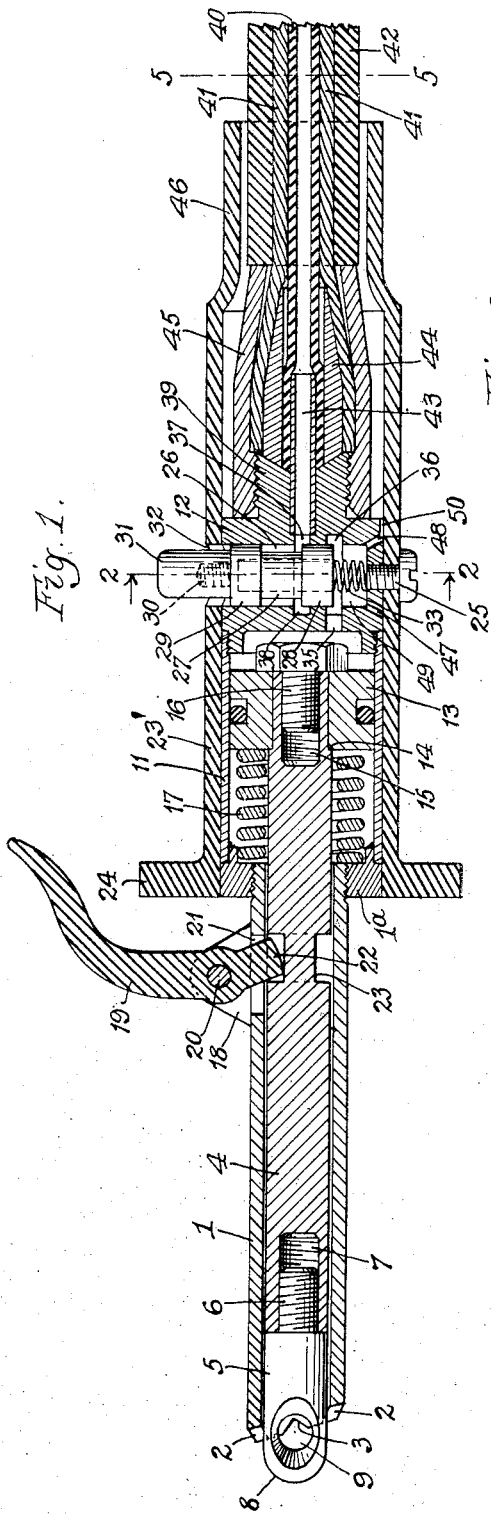
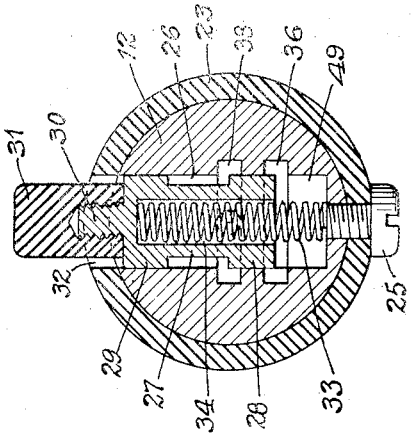
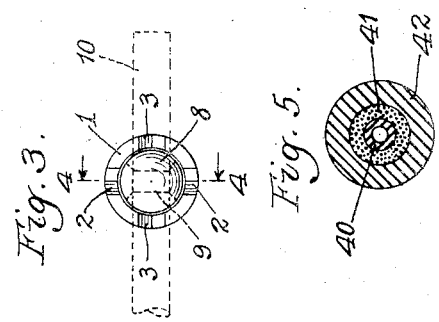
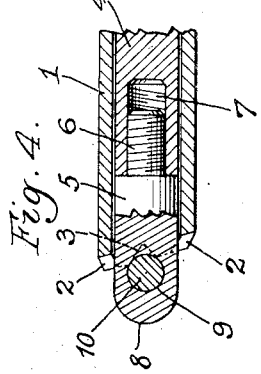
Inventors
Vernon R. Johnson
Lester W. Wachter
by *[signature]*
Attorneys.

Patented July 1, 1947

2,423,324

UNITED STATES PATENT OFFICE 2,423,324

WELDER HANDLE

Vernon R. Johnson and Lester W. Wachter, Streator, Ill., assignors to Anthony Development Company, Streator, Ill., a syndicate Application December 2, 1944, Serial No. 566,294

7 Claims. (Cl. 219—8)

This invention relates to a welder handle, and has for one object to provide a handle adapted removably to receive and retain a welding rod.

Another object is to provide, in connection with such a handle, spring means for holding the rod in engagement with the handle, and power-operated means for releasing the rod from engagement with the handle.

A further object is to associate with said power-operated means a cooling effect which operates as a result of the operation of the power-operated means.

A further object of the invention is to provide, in connection with a welder handle, an air pressure cylinder and piston assembly for moving the welding rod-engaging member and to provide, in connection with such system, a controlling valve for controlling its movement and for discharging air into or adjacent the handle to effect cooling as an incidental result of the operation of the power means.

Other objects will appear from time to time throughout the specification and claims.

This invention is illustrated more or less diagrammatically in the accompanying drawings, wherein:

Figure 1 is a longitudinal cross section through one form of the device, with parts in elevation;

Figure 2 is a transverse section taken on an enlarged scale at line 2—2 of Figure 1;

Figure 3 is an end elevation of the welding rod gripping means;

Figure 4 is a longitudinal sectional detail taken at line 4—4 of Figure 3; and

Figure 5 is a transverse section through the cable and pressure fluid supplying means, taken at line 5—5 of Figure 1.

Like parts are indicated by like characters throughout the specification and drawings.

In the particular form here shown, the welder handle includes a generally tubular member 1 which is provided with an open forward end which, as shown in Figures 1 and 4, is inclined. The open end is provided with pairs of oppositely placed notches 2, 2 and 3, 3. Slidably mounted within the generally tubular member 1 is a welding rod-engaging member 4. This welding rod-engaging member is provided with a rod-engaging nose portion which may be integral with the member 4 or may be removable therefrom. As shown, it includes a member 5 which is provided with a reduced threaded portion 6 receivable in a correspondingly threaded depression or cavity 7 formed in the member 4. The member 5 may be rounded at its outer end, as at 8, and is provided with a perforation 9 which may or may not be tapered. As shown in the figures it is tapered. The perforation 9 is of such size as to receive a welding rod 10. This rod is shown in Figures 3 and 4 and fits within the perforation or cavity 9, and when the member 4 is drawn inwardly into the tubular member 1, the rod will be gripped within the perforation 9 and against the end of the tubular member 1, preferably fitting into one of the pairs of grooves in the end of that member.

The tubular member 1 is received in a flat member 1a. It may be threaded into that member, as indicated in Figure 1, or otherwise secured to it. Fastened also to the member 1a is a housing part or cylinder 11. This is secured to a valve housing member 12 and may be threaded to it or otherwise secured to it.

Positioned within the cylinder 11 for reciprocation therein is a piston 13. The piston is perforated and receives one end of the member 4, which may be reduced as shown in Figure 1 to provide a shoulder 14. The inner end of the member 4 is preferably provided with a threaded perforation 15 in which a screw 16 may be received. The screw holds the piston and the member 4 together. A compression spring 17 is positioned about the member 4 and within the cylinder 11 and bears at one end against the member 1a and at the other end against the piston 13, serving when free to do so to carry the piston inwardly within the cylinder and thus to carry the member 4 and the welding rod-engaging part 5 into the tubular member 1 and so to hold the welding rod in position against the open end of the member 1.

Power means will be described for operating the piston. However, manual means are also provided, and they will be described first.

The tubular housing member 1 may be provided with a pair of ears 18 between which an operating lever 19 is journaled, as on a pin 20. The operating lever is preferably of insulating material. The barrel of the member 1 is slotted, as at 21, to permit the nose or end 22 of the lever 19 to pass through it and into a reduced portion 23 of the member 4. By means of this handle or lever the member 4 may be forced outwardly against the resistance of the spring 17. The parts thus far described are preferably received within an insulating housing 23', which may have an enlarged flange 24 adjacent one end. While the mechanism may be held within the housing by any desired means, one convenient means is shown and comprises a screw 25 which passes through a suitable opening in the housing 23 and is threaded into the valve housing 12.

The valve housing is provided with a generally cylindrical portion 26 within which a piston valve 27 is mounted for reciprocation. As shown, the valve 27 includes two enlarged valve portions 28 and 29. Integral with the valve 27 is a threaded projection 30 upon which a handle 31 of insulating material is threaded. The housing 23 is provided with a perforation or opening 32 through which the handle may be inserted. A spring 33 bears at one end against the screw 25 or against a suitable portion of the valve housing 12 and at its other end it bears against the valve 27. In the particular form here shown the spring 33 is partly received within a cavity 34 formed in the valve 27. The spring, when free to do so, holds the valve in the raised position.

An outlet passage 35 forms a communication between the cavity 26 of the valve housing and the interior of the cylinder 11. It communicates with an enlargement 36 which is formed in the passage or cylindrical cavity 26. An inlet passage 37 communicates with an enlargement 38 formed in the cylindrical cavity 26 in the valve housing 12. The inlet passage 37 may communicate with a corresponding passage in an exteriorly threaded enlargement 39 which, as here shown, is integral with the valve housing 12.

Means are provided for conducting pressure fluid, preferably air, to the valve housing and for conducting electrical current to the welding rod. These means include a composite cable assembly. As shown in Figures 1 and 5, this cable includes a central air-tight tube 40, a body of electrical conductors 41 and an exterior insulating tube or envelope 42. The interior tube 40 is preferably flexible and may be formed of any suitable material. Natural rubber, synthetic rubber and a wide variety of synthetic materials may be used. To connect the central tube 40 in an air-tight manner to the member 39, a connector part 43 may be used, and this part, as here shown, is a tubular member which penetrates into the tube 40 and into the member 39. For that purpose the passage 37 may be enlarged to provide a shoulder, as shown, although this feature is not essential. A contact member 44 is positioned about the tube 40 and is in electrical contact with the conductors 41 and with the extension 39 of the valve housing 12. An interiorly threaded fastening member 45 is also in contact with the conductors 41 and with the housing member 39 and holds the parts in tight contact to assure an adequate electrical contact. The insulation 42 merely surrounds the parts above described and extends part-way into the handle or housing 23, which latter may be reduced, as at 46, as shown in Figure 1.

The cooling means will now be described. As shown, one or more ducts or passages 47, 48 are formed in the valve housing and extend outwardly from the cavity 49. Any desired number of such ducts may be used, and the ducts 48 may communicate with grooves 50 formed in the exterior of the housing 12. When the valve is in the position of Figures 1 and 2, the ducts 47 and 48 communicate freely with the interior cavity 49 and with the exterior of the housing and air within the cylinder is discharged through them as the spring 17 returns the piston to the right, and thus air is discharged into the handle from the cylinder. Not only is this air discharged, but since the air has been under compression, a refrigerating effect occurs as it expands to room pressure.

The handle or housing 23 may fit loosely enough about the cylinder 11 and the valve housing 12 to permit the air to circulate freely between them. Whether or not this is the case, the air is discharged from the ducts 48 through the grooves 50 into the rearward portion of the interior of the handle. By this means the air which enters under pressure into the cylinder and which operates the welding rod gripping means to move it in the releasing direction also serves to cool the handle.

If desired, a bleeder opening may be formed in the valve housing so that air is discharged to some degree, at least, constantly into the handle. Also, the valve itself may be positioned with sufficient looseness in the valve housing to permit a more or less continuous escape of air into and around the housing. The pressure fluid, preferably air, thus serves the dual purpose of operating the power means for moving the welder rod-engaging means and that of cooling the handle.

Although we have shown an operative form of our invention, it will be recognized that many changes in the form, shape and arrangement of parts can be made without departing from the spirit of the invention, and our showing is therefore to be taken as, in a sense, diagrammatic.

The use and operation of this invention are as follows:

When the handle is to be used for welding, it is connected to a welder and the conductors 41 are thus in electrical contact with a source of current. The tube 40 is also connected to a source of pressure fluid, preferably compressed air. With the parts as shown in Figure 1, the compressed air enters the cylindrical passage 26 in the valve housing, and because of the position of the valve, the air cannot penetrate further.

When it is desired to insert a welding rod, the piston valve is depressed from the position shown in Figure 1 until the valve portion 28 clears a passage by means of which air moves through the tube 40, the passages 37, 38 and 35 into the cylinder 11. The air will be furnished through this path under sufficient pressure to force the piston 13 outwardly or to the left against the resistance of the spring 17, and thus the member 4 carrying the welding rod-engaging member 5 is forced outwardly. In that position a welding rod may be inserted in the opening 9 and the parts may be then rotated so that the welding rod will lie within either of the pairs of notches 2, 2 or 3, 3. Then the valve 27 is allowed to rise under the influence of the spring 33 and air under pressure is no longer furnished to the cylinder. Thereupon the spring 17 returns the piston and the members 4 and 5 to the full line position of Figure 1 and the welding rod is tightly held, as shown in Figure 4, being gripped within the perforation 9 of the member and lying normally within one of the pairs of notches. The parts will remain in this position until the valve is again moved to actuate the piston, when the welding rod will be free and can be dropped out or removed.

We claim:

1. In combination in a welder handle, a welding rod-gripping means comprising a part and a member movably mounted to move therealong, said member shaped to engage a welding rod, and a spring effective on said member and biased to move it inwardly to hold a rod between said member and said part, and a piston formed on said member, a cylinder thereabout, means for conducting air under pressure to said cylinder, whereby said piston is caused to move against the resistance of said spring to carry said member outwardly, and discharge means for said air to said housing, whereby the latter is cooled.

2. In combination in a welder handle, a welding rod-gripping means comprising a hollow part and a member movably mounted therein and surrounded and guided thereby, said member shaped to engage a welding rod, and a spring effective on said member and biased to move it in one direction, and a piston on said member, a cylinder thereabout, means for conducting air under pressure to said cylinder, whereby said piston is caused to move against the resistance of said spring to carry said member in a direction opposite to that in which it is moved by said spring, and means shaped to discharge air to said housing, whereby the latter is cooled.

3. In combination in a welder handle, a welding rod-gripping means comprising a part and a member movably mounted to move therealong, said member shaped to engage a welding rod, and a spring effective on said member and biased to move it in one direction, and a piston formed on said member, a cylinder thereabout, means for conducting air under pressure to said cylinder, whereby said piston is caused to move against the resistance of said spring to carry said member oppositely to the direction in which it is moved by said spring, and means shaped to discharge air to said housing, whereby the latter is cooled as an incident to the movement of said piston.

4. In combination in a welding handle, a welding rod-engaging member, said member being shaped to receive and engage a welding rod, a housing surrounding said member, said member mounted to reciprocate within said housing, and a spring biased normally to carry said member to grip a welding rod between it and the said housing, a piston on said member, a cylinder surrounding said piston, means for operating said piston against the influence of said spring, said means including a valve housing, a valve movably mounted therein, an inlet passage in said housing, a pressure fluid conduit connected with said passage, electrical conducting members connected to said handle, and means for moving said valve to open a passage for pressure fluid from said conduit into said cylinder, whereby said piston is moved in opposition to said spring to move said member out of engaging position with respect to said housing, and openings in said valve housing communicating with said handle, whereby air is caused to pass from within said housing into said handle.

5. In combination in a welder handle, a welding rod-gripping means comprising a hollow part and a member movably mounted therein and surrounded and guided thereby, said member shaped to engage a welding rod, and a spring effective on said member and biased to move it in one direction, and a piston on said member, a cylinder thereabout, means for conducting air under pressure to said cylinder, whereby said piston is caused to move against the resistance of said spring to carry said member in a direction opposite to that in which it is moved by said spring, and means shaped to discharge air to said housing, whereby the latter is cooled, said cylinder, said hollow part and said movable member being axially aligned and concentric with respect to each other and a valve housing positioned in communication with said cylinder, a valve in said housing and means for moving said valve to control the movement of air to and from said cylinder.

6. In combination in a welder handle, a welding rod-gripping means comprising a hollow part and a member movably mounted therein and surrounded and guided thereby, said member shaped to engage a welding rod, and a spring effective on said member and biased to move it in one direction, and a piston on said member, a cylinder thereabout, means for conducting air under pressure to said cylinder, whereby said piston is caused to move against the resistance of said spring to carry said member in a direction opposite to that in which it is moved by said spring, and means shaped to discharge air to said housing, whereby the latter is cooled, and a valve housing associated with said cylinder, a valve in said housing adapted to control the movement of air to and from said cylinder and a handle member surrounding said cylinder and said valve housing, said valve provided with a removable member projecting through said handle means.

7. In combination in a welder handle, a welding rod-gripping means comprising a hollow guiding part and a member movably mounted therein, said member shaped to engage a welding rod, and a spring effective on said member and biased to move it inwardly to hold a rod between said member and said part, a piston on said member, a cylinder thereabout, means for conducting air under pressure to said cylinder, to cause said piston to move against the resistance of said spring to carry said member outwardly to rod-releasing position, means for discharging air from said cylinder to said handle, whereby the latter is cooled, said hollow guiding part having an opening in its side and manual means for moving said member to rod-releasing position in the event of air failure comprising a handle positioned on said hollow guiding part and projecting through said opening, there being an engaging portion formed in said movable member, and said handle engaged with said engaging portion.

VERNON R. JOHNSON.
LESTER W. WACHTER.

REFERENCES CITED

The following references are of record in the file of this patent:

UNITED STATES PATENTS

| Number | Name | Date |
| --- | --- | --- |
| 1,240,901 | Symons | Sept. 25, 1917 |
| 1,507,788 | McCarty | Sept. 9, 1924 |
| 1,604,069 | Owen | Oct. 19, 1926 |
| 1,928,517 | Varner | Sept. 26, 1933 |
| 2,350,614 | Jackson | June 6, 1944 |